May 22, 1928. 1,670,952

I. W. BORDEN

HAND CULTIVATOR

Filed Sept. 28, 1927

Inventor
Ira W. Borden
By C.A.Snow & Co
Attorneys

Patented May 22, 1928.

1,670,952

UNITED STATES PATENT OFFICE.

IRA W. BORDEN, OF VINCENNES, INDIANA.

HAND CULTIVATOR.

Application filed September 28, 1927. Serial No. 222,599.

The device forming the subject matter of this application is a spring garden plow, or cultivator, of that general type which is operated by hand.

One object of the invention is to provide novel means whereby the teeth are prevented from swinging on the carrying bar.

Another object of the invention is so to arrange the soil-engaging elements or plows that they will be peculiarly effective in cultivating the soil.

Another object of the invention is to provide novel means whereby the handle may be arranged at different angles with respect to the implement proper.

It is within the province of the disclosure to improve generally and to enhance the utility of devices of that type to which the invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
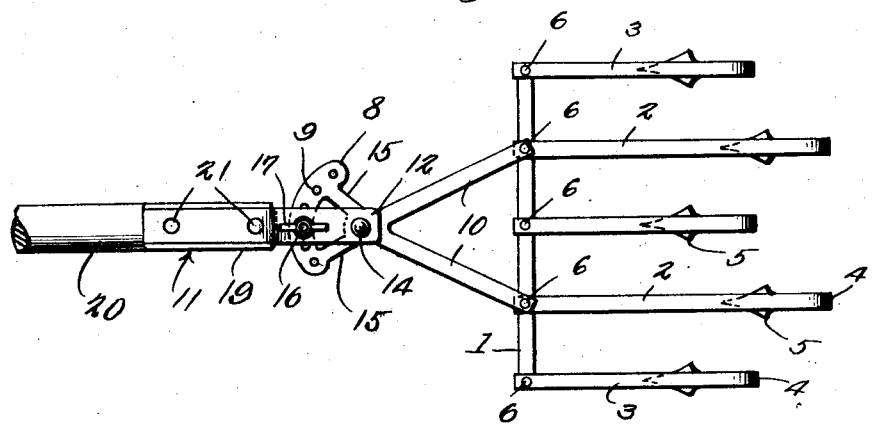
Figure 1 shows in top plan, a device constructed in accordance with the invention.
Figure 2:
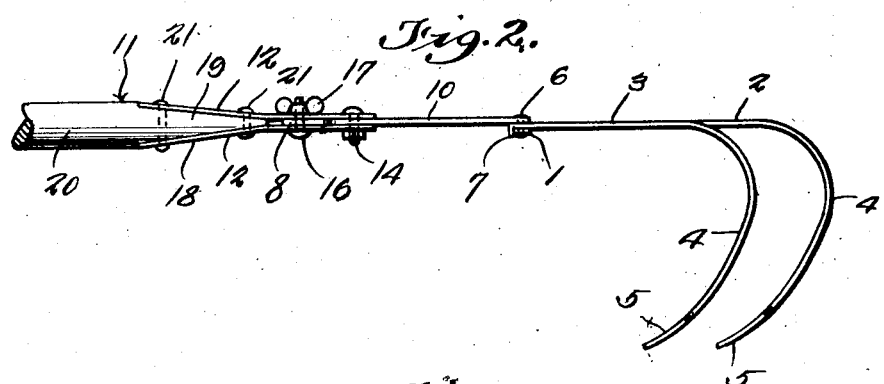
Figure 2 is a side elevation.
Figure 3:
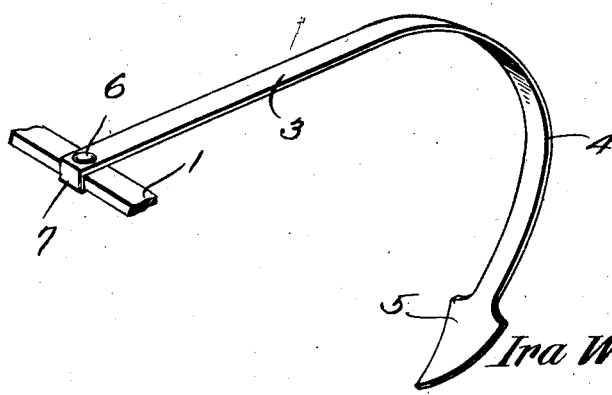
Figure 3 is a perspective view of one of the teeth, mounted on the carrying bar.

In carrying out the invention, there is provided a bar 1. The teeth of the cultivator include long shanks 2 and short shanks 3, arranged in alternating order, and parallel to each other, the shanks 2 and 3 carrying depending goose necks 4 on the lower ends of which the soil-engaging elements or plows are mounted. Owing to the fact that some of the shanks are long, whereas others of the shanks are short, divers of the soil-engaging elements or plows 5 will be disposed ahead of the other soil-engaging elements or plows, an observation which will be understood readily when Figures 1 and 2 of the drawings are examined. The shanks 2 and 3 and the goose necks 4 preferably are made of spring metal. The shanks 3 and 2 extend at their forward ends across the carrying bar 1, and are connected to the carrying bar by securing elements 6. In order to prevent the shanks 2 and 3 from swinging on the securing elements 6, the forward ends of the shanks are turned down to form fingers 7 that engage the forward edge of the carrying bar 1.

The numeral 8 marks a segment provided with a plurality of openings 9, arranged in an arc, the rear end of the segment 8 being joined to rearwardly diverging braces 10. The rear ends of the braces 10 are superposed on the forward ends of the long shanks 2 and are held upon the said shanks and upon the carrying bar 1, by the securing elements 6 that connect the aforesaid shanks to the carrying bar.

The numeral 11 designates generally, a laterally adjustable handle. The handle 11 may be made in various ways. As shown in the drawings, it embodies a pair of parallel strips 12 which are mounted to swing on a pivot element 14 mounted in the braces 10 at the place where the braces join the rearwardly extended arms 15 of the segment 8. The pivot element 14 is the center of the arc in which the openings 9 of the segment are located. In the strips 12 is mounted a keeper, such as a bolt 16, the keeper being adapted to be received in any of the openings 9 of the segment 8. A wing nut 17 is threaded on the keeper or bolt 16 and holds the keeper in place. The strips 12 diverge, as at 18, to receive the wedge-shaped end 19 of a staff 20 which forms part of the handle 11, and securing devices, such as rivets 21, pass through the diverging ends 18 of the strips 12, and through the end 19 of the staff 20, to secure the staff to the strips.

The keeper or bolt 16 may be withdrawn, and the handle 11 may be swung around to any desired angle within the scope of the segment 18 and, then, the bolt 16 may be replaced, and the wing nut 17 mounted on the bolt. The parts 10—15—8 constitute a forwardly presented frame on which the handle 11 is pivoted and held adjustably for lateral movement.

When the implement is drawn over the surface of the soil by means of the handle 11, the soil-engaging elements 5 will operate in a well known way to cultivate and clear between rows, to turn up the soil, and to operate, generally, in a way well understood by those who have had anything to do with cultivators.

What is claimed is:—

In a device of the class described, a carrying member, soil-engaging elements on the carrying member, a frame assembled with the carrying member, and including a segment having openings extended therethrough, strips located on opposite sides of the frame, a pivot element connecting the strips to the frame, a bolt mounted in the strips and insertable into any of the openings in the segment, a nut on the bolt and engaging one of the strips, and a staff held between the strips, the staff and the strips constituting a handle.

In testimony that I claim the foregoing as my own, I have hereto affixed my signature.

IRA W. BORDEN.